(12) United States Patent
Sohn et al.

(10) Patent No.: US 9,818,350 B2
(45) Date of Patent: Nov. 14, 2017

(54) METHOD OF SYNCHRONIZING A DRIVING MODULE AND DISPLAY APPARATUS PERFORMING THE METHOD

(71) Applicant: Samsung Display Co., LTD., Yongin, Gyeonggi-Do (KR)

(72) Inventors: Young-Soo Sohn, Guri-si (KR); Ki-Tae Yoon, Asan-si (KR); Jae-Gwan Jeon, Incheon (KR); Akihiro Takegama, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 130 days.

(21) Appl. No.: 14/294,527

(22) Filed: Jun. 3, 2014

(65) Prior Publication Data

US 2015/0195516 A1 Jul. 9, 2015

(30) Foreign Application Priority Data

Jan. 7, 2014 (KR) ........................ 10-2014-0001841

(51) Int. Cl.
| | | |
|---|---|---|
| *H04N 13/04* | (2006.01) | |
| *G09G 3/36* | (2006.01) | |
| *G09G 5/12* | (2006.01) | |
| *G06F 3/14* | (2006.01) | |
| *G09G 3/00* | (2006.01) | |

(52) U.S. Cl.
CPC ............. *G09G 3/36* (2013.01); *G09G 3/3666* (2013.01); *G09G 5/12* (2013.01); *G06F 3/1446* (2013.01); *G09G 3/003* (2013.01); *G09G 2300/026* (2013.01); *G09G 2300/0426* (2013.01); *G09G 2356/00* (2013.01)

(58) Field of Classification Search
CPC .... G09G 3/36; G09G 3/36666; G09G 3/1446; G09G 3/0003; G09G 5/12; G09G 2300/026; G09G 2300/0426; G09G 2356/00
USPC .......................................... 326/93; 348/51–60
See application file for complete search history.

(56) References Cited

U.S. PATENT DOCUMENTS

| | | | | |
|---|---|---|---|---|
| 7,492,342 B2* | 2/2009 | Aoki | ..................... | G09G 3/2085 345/99 |
| 7,728,619 B1 | 6/2010 | Tzou et al. | | |
| 8,188,963 B2* | 5/2012 | Park | ..................... | G09G 3/3648 345/99 |
| 8,300,033 B2* | 10/2012 | Nam | ..................... | G09G 3/3611 345/204 |
| 8,443,132 B2 | 5/2013 | Poo | | |
| 8,624,817 B2* | 1/2014 | Kim | ......................... | G09G 3/20 345/99 |

(Continued)

FOREIGN PATENT DOCUMENTS

| | | |
|---|---|---|
| JP | 2007104539 A | 4/2007 |
| KR | 1020100130086 A | 12/2010 |

*Primary Examiner* — Alexander H Taningco
*Assistant Examiner* — Nelson Correa
(74) *Attorney, Agent, or Firm* — Cantor Colburn LLP (57) ABSTRACT

A method of synchronizing a driving module includes applying a plurality of original data enable ("DE") signals to a plurality of timing controller of the driving module, respectively, generating a synch DE signal from the driving module based on the earliest signal among the original DE signals, and transferring the synch DE signal to the plurality of timing controllers in a cascade mode.

20 Claims, 7 Drawing Sheets

(56) References Cited

U.S. PATENT DOCUMENTS

| | | | |
|---|---|---|---|
| 8,643,638 B2* | 2/2014 | Bae | G09G 3/3648 |
| | | | 345/100 |
| 8,698,857 B2* | 4/2014 | Kim | G09G 5/008 |
| | | | 345/691 |
| 9,129,551 B2* | 9/2015 | Kim | G09G 3/20 |
| 9,196,218 B2* | 11/2015 | Kim | G09G 5/008 |
| 2005/0264511 A1* | 12/2005 | Takaki | G09G 3/20 |
| | | | 345/98 |
| 2006/0077197 A1* | 4/2006 | Lin | G09G 3/3677 |
| | | | 345/204 |
| 2011/0078350 A1 | 3/2011 | Carls | |
| 2012/0235964 A1 | 9/2012 | Kim et al. | |

* cited by examiner

METHOD OF SYNCHRONIZING A DRIVING MODULE AND DISPLAY APPARATUS PERFORMING THE METHOD

This application claims priority to Korean Patent Application No. 10-2014-0001841, filed on Jan. 7, 2014, and all the benefits accruing therefrom under 35 U.S.C. §119, the content of which in its entirety is herein incorporated by reference.

BACKGROUND

1. Field

Exemplary embodiments of the invention relate to a method of synchronizing a driving module and a display apparatus performing the method. More particularly, exemplary embodiments of the invention relate to a method of synchronizing a driving module for simplifying a circuit design and a display apparatus performing the method.

2. Description of the Related Art

Recently, a liquid crystal display ("LCD") apparatus has been widely used in application technologies, such as computer games using high-resolution videos and three-dimensional ("3D") images.

In such an LCD apparatus, a motion interpolation frame may be inserted between a present frame and a previous frame to decrease motion blur in a high-resolution video. A high-speed frame driving method is typically used to insert the motion interpolation frame between the present frame and the previous frame.

Additionally, a frame image is typically divided into a left-eye image and a right-eye image having binocular disparity to display a 3D image. That is, one frame image is divided into a left-eye frame and a right-eye frame. Therefore, a high-speed frame driving method is typically used to display a 3D image.

The high-speed frame driving method uses a driving device in a multi-chip structure including two or more timing controllers having a frequency of about 60 hertz (Hz) or about 120 Hz.

SUMMARY

In a driving device in a multi-chip structure included in a display device and used for high-speed frame driving method, when synchronization between the chips is not matched, an image may be abnormally displayed to the liquid crystal display apparatus, and waterfall defects and charge rate defects may occur.

Exemplary embodiments of the invention provide a method of synchronizing a driving module of a display device for improving a display quality and simplifying a circuit design.

Exemplary embodiments of the invention provide a display apparatus that performs the method of synchronizing the driving module.

According to an exemplary embodiment of the invention, a method of synchronizing a driving module includes applying a plurality of original data enable ("DE") signals to a plurality of timing controller of the driving module, generating a synch DE signal from the driving module based on the earliest signal among the original DE signals, and transferring the synch DE signal to the timing controllers in a cascade mode.

In an exemplary embodiment, a master timing controller of the timing controllers may be configured to determine an original DE signal applied thereto as a first DE signal, and to transfer the first DE signal to a slave timing controller of the timing controllers.

In an exemplary embodiment, a first slave timing controller of the timing controllers may be configured to determine an earlier signal of an original DE signal applied thereto and the first DE signal as a second DE signal, and to transfer the second DE signal to a second slave timing controller of the timing controllers.

In an exemplary embodiment, a last slave timing controller of the timing controllers may be configured to generate the synch DE signal, which is delayed by a predetermined period from an earlier signal of an original DE signal applied thereto and a DE signal received from a previous slave timing controller thereof.

In an exemplary embodiment, the last slave timing controller of the timing controllers may transfer the synch DE signal to a plurality of previous timing controllers thereof in the cascade mode.

In an exemplary embodiment, each of the timing controllers may be configured to write image data at a memory thereof based on the original DE signal applied thereto, and read out the image data from the memory based on the synch DE signal.

In an exemplary embodiment, the synch DE signal may be generated every frame period.

According to an exemplary embodiment of the invention, a display apparatus includes a driving module including a plurality of timing controllers, where the driving module is configured to generate a synch DE signal based on the earliest signal among a plurality of original DE signals applied to the timing controllers, respectively, and to transfer the synch DE signal to the timing controllers in a cascade mode, and a display panel configured to display an image on a plurality of display blocks thereof based on a control by the timing controllers, which are synchronized with each other based on the synch DE signal.

In an exemplary embodiment, a master timing controller of the timing controllers may be configured to determine an original DE signal applied thereto as a first DE signal, and to transfer the first DE signal to a slave timing controller of the timing controllers.

In an exemplary embodiment, a first slave timing controller of the timing controllers may be configured to determine an earlier signal of an original DE signal applied thereto and the first DE signal as a second DE signal, and to transfer the second DE signal to a second slave timing controller of the timing controllers.

In an exemplary embodiment, a last slave timing controller of the timing controllers may be configured to generate the synch DE signal, which is delayed by a predetermined period from an earlier signal of an original DE signal applied thereto and a DE signal received from a previous slave timing controller thereof.

In an exemplary embodiment, the last slave timing controller may be configured to transfer the synch DE signal to a plurality of previous timing controllers thereof in the cascade mode.

In an exemplary embodiment, each of the timing controllers may include a memory, and each of the timing controllers may be configured to write image data at the memory based on the original DE signal applied thereto, and be configured to read out the image data from the memory based on the synch DE signal.

In an exemplary embodiment, each of the timing controllers may include a first input pin configured to receive a DE signal of a previous slave timing controller, a first output pin configured to output a DE signal thereof to next slave timing controller, a second input pin configured to receive the synch DE signal from the next slave timing controller and a second output pin configured to output the synch DE signal to the previous slave timing controller.

In an exemplary embodiment, the driving module may further include a printed circuit board on which a timing controller of the timing controllers is disposed.

In an exemplary embodiment, the driving module may further include a plurality of printed circuit boards, on which the timing controllers are disposed, and each of the printed circuit boards may include a first connector and a second connector, where the first connector of a printed circuit board is connected to the second connector of a next printed circuit board, and the second connector of the printed circuit board is connected to the first connector of a previous printed circuit board.

In an exemplary embodiment, the first connector may include a first output terminal configured to output a DE signal and a first input terminal configured to receive the synch DE signal, and the second connector may include a second input terminal configured to receive a DE signal and a second output terminal configured to output the synch DE signal.

In an exemplary embodiment, the display blocks may extend substantially in a first direction, which is an extending direction of a data line in the display panel, and may be arranged substantially in a second direction, which is an extending direction of a gate line in the display panel.

In an exemplary embodiment, the display blocks may be arranged substantially in a matrix form.

In an exemplary embodiment, a number of the timing controllers may be equal to a number of the display blocks According to exemplary embodiments of the invention, the plurality of timing controllers is synchronized based on the synch DE signal, which is delayed by a predetermined period from the earliest signal among the original DE signals of the timing controllers, such that the data synchronization of the timing controllers may be effectively achieved. Therefore, a display quality of a high-resolution image may be improved by the data synchronization. In such embodiments, the timing controller may be achieved the data synchronization only using two input pins and two output pins. Thus, the number of the pin of the timing controller may be decreased and the number of the terminal of the connector which connects between adjacent printed circuit boards may be decreased. Therefore, the circuit design of the control driving module may be simplified.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 1:
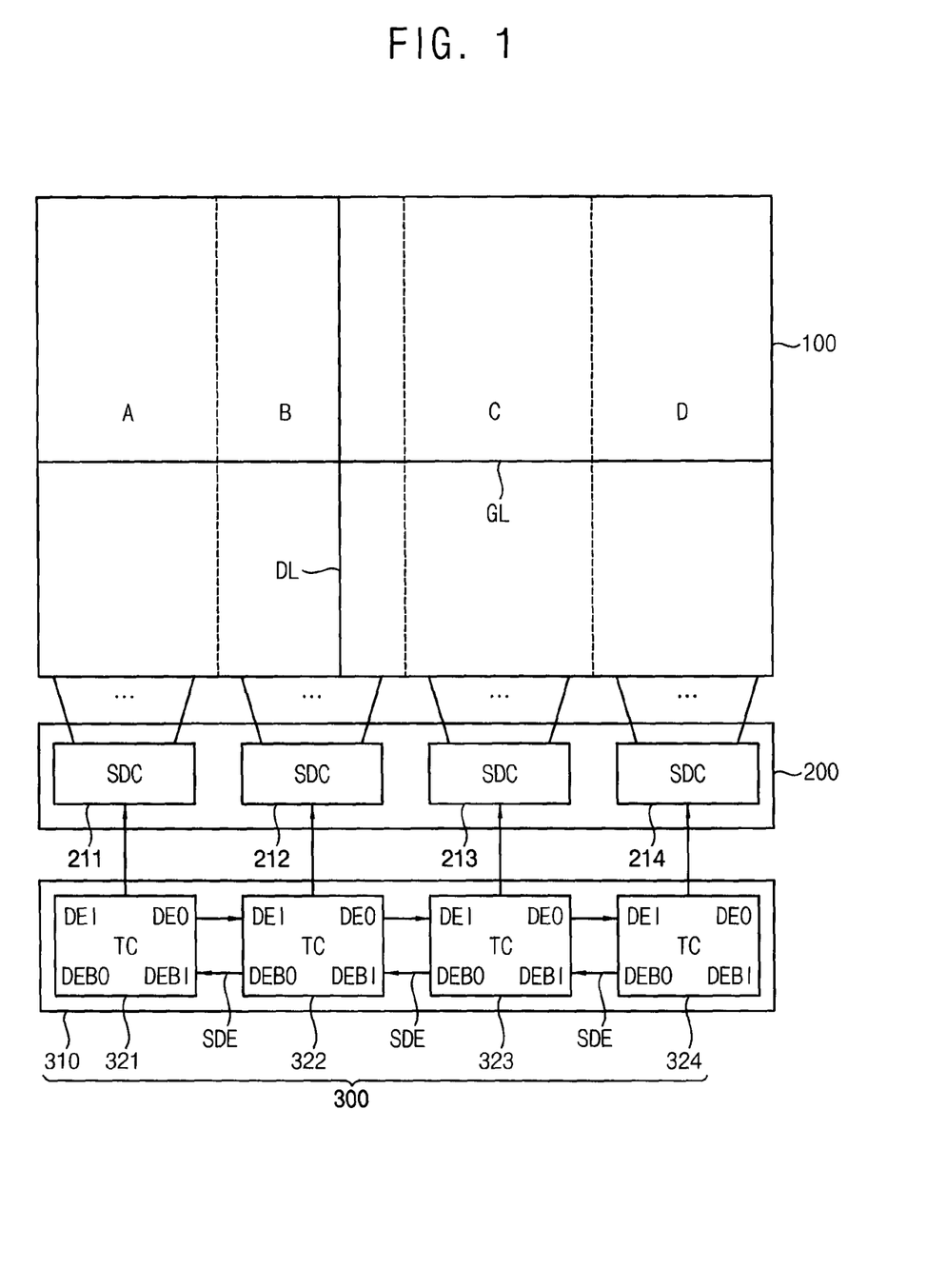
FIG. 1 is a block diagram illustrating an exemplary embodiment of a display apparatus according to the invention.

FIG. 1 is a block diagram illustrating an exemplary embodiment of a display apparatus according to the invention.

Referring to FIG. 1, an exemplary embodiment of the display apparatus may include a display panel 100, a source driving module 200 and a control driving module 300.

The display panel 100 includes a plurality of display blocks. A number of the display blocks may correspond to a number of a plurality of timing controllers in the control driving module 300.

In an exemplary embodiment, the display blocks A, B, C and D extend substantially in a first direction, which is an extending direction of a data line DL, and are arranged substantially in a second direction, which is an extending direction of a gate line GL. Each of the display blocks may have a resolution higher than a full high-definition ("FHD") resolution, e.g., a resolution of 1920×1080 pixels in a 16:9 aspect ratio. In one exemplary embodiment, for example, as shown in FIG. 1, when the display block has the FHD resolution, the display panel 100 has a resolution four times the FHD resolution.

The source driving module 200 may include a plurality of source driving circuits (referred to as "SDC" in FIGS. 1) 211, 212, 213 and 214 to drive the display blocks A, B, C and D, respectively. In one exemplary embodiment, for example, a first source driving circuit 211 is configured to provide a plurality of data lines of a first display block A with a plurality of data signals. A second source driving circuit 212 is configured to provide a plurality of data lines of a second display block B with a plurality of data signals. A third source driving circuit 213 is configured to provide a plurality of data lines of a third display block C with a plurality of data signals. A fourth source driving circuit 214 is configured to provide a plurality of data lines of a fourth display block D with a plurality of data signals. Each of the source driving circuits 211, 212, 213 and 214 may include a source driver integrated circuit ("IC").

The control driving module 300 may include a plurality of timing controllers (referred to as "TC" in FIGS. 1) 321, 322, 323 and 324, and a printed circuit board 310, on which the plurality of timing controllers 321, 322, 323 and 324 is disposed. One timing controller 321 of the timing controllers 321, 322, 323 and 324 may be set as a master, and remaining timing controllers 322, 323 and 324 may be set as a slave.

In an exemplary embodiment, a timing controller (TC) may be configured to drive a display block having the FDH resolution. Thus, in such an embodiment, a number of the timing controller (TC) may equal to a number of the display blocks.

The timing controllers 321, 322, 323 and 324 respectively correspond to the source driving circuits 211, 212, 213 and 214. The timing controllers 321, 322, 323 and 324 are configured to receive image data and an original control signal. The image data is for displaying an image on corresponding display block and may include red, green and blue data. The original control signal may include an original horizontal synch signal, an original vertical synch signal and an original data enable ("DE") signal.

In one exemplary embodiment, for example, a first timing controller 321 is configured to receive first image data corresponding to the first display block A and a first original control signal to drive the first source driving circuit 211. A second timing controller 322 is configured to receive second image data corresponding to the second display block B and a second original control signal to drive the second source driving circuit 212. A third timing controller 323 is configured to receive third image data corresponding to the third display block C and a third original control signal to drive the third source driving circuit 213. A fourth timing controller 324 is configured to receive third image data corresponding to the fourth display block D and a fourth original control signal to drive the fourth source driving circuit 214.

In an exemplary embodiment, for data synchronization, a master timing controller, e.g., the first timing controller 321, of the timing controllers 321, 322, 323 and 324 is configured to output the original DE signal to a first slave timing controller, e.g., the second timing controller 322. Each of other slave timing controllers, e.g., the third and fourth timing controllers 323 and 324, is configured to output an earlier signal of the original DE signal and the DE signal received from a previous slave timing controller to a next slave timing controller. A last slave timing controller, e.g., the fourth timing controller 324, is configured to generate a synch DE signal SDE which is delayed by a predetermined period LD from an earlier signal of an original DE signal and a DE signal received from the previous slave timing controller, and to sequentially transfer the synch DE signal SDE to the previous slave timing controllers 323, 322 and 321 in a cascade mode. The timing controllers 321, 322, 323 and 324 may perform the data synchronization based on the synch DE signal SDE. Herein, an earlier signal of two signals means the signal having a time phase earlier than the other signal among the two signals.

Therefore, the timing controllers 321, 322, 323 and 324 may be achieved the data synchronization using the synch DE signal SDE based on the earliest signal or the signal having the earliest time phase among the original DE signals received during a frame period.

In an exemplary embodiment, the timing controller (TC) may include a first input pin DEI which is configured to receive a DE signal from a previous timing controller, a first output pin DEO which is configured to output a DE signal to a next timing controller, a second input pin DEBI which is configured to receive the synch DE signal from the next timing controller, and a second output pin DEBO which is configured to output the synch DE signal to the previous timing controller.

According to an exemplary embodiment, the timing controller (TC) may achieve the data synchronization only using two input pins DEI and DEBI and two output pins DEO and DEBO. Therefore, a number of the pin of the timing controller TC may be decreased, such that a circuit design of the control driving module 300 may be simplified.

Figure 2:
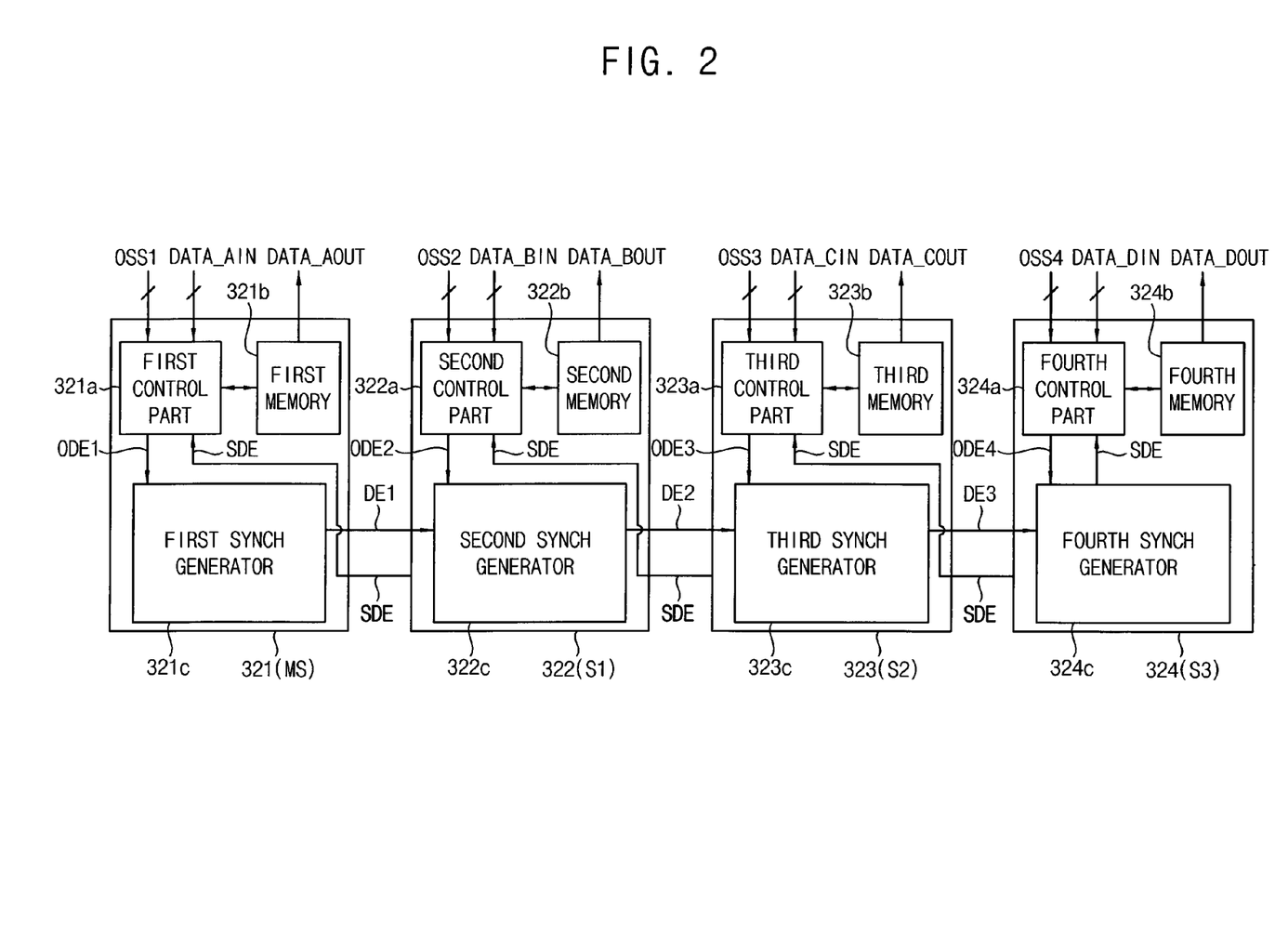
FIG. 2 is a block diagram illustrating an exemplary embodiment of a control driving module of FIG. 1.

FIG. 2 is a block diagram illustrating an exemplary embodiment of a control driving module of FIG. 1.

Referring to FIGS. 1 and 2, the control driving module 300 may include a printed circuit board 310, and includes a plurality of timing controllers, e.g., a first timing controller 321, a second timing controller 322, a third timing controller 323 and a fourth timing controller 324, which are disposed on the printed circuit board 310. In an exemplary embodiment, the first timing controller 321 may be set as a master MS, the second timing controller 322 may be set as a first slave S1, the third timing controller 323 may be set as a second slave S2, the fourth timing controller 324 may be set as a third slave S3, that is, a last slave.

The first timing controller 321 may include a first control part 321a, a first memory 321b and a first synch generator 321c.

The first control part 321a is configured to receive a first original control signal OSS1 and first image data DATA_AIN from an external system. The first control part 321a is configured to store the first image data DATA_AIN at the first memory 321b based on a first original DE signal ODE1 of the first original control signal OSS1.

The first control part 321a is configured to receive the synch DE signal SDE from the second timing controller 322, which is the next timing controller thereof. The first control part 321a is configured to read out the first image data DATA_AOUT from the first memory 321b based on the synch DE signal SDE.

The first synch generator 321c is configured to generate a first DE signal DE1 based on the first original DE signal ODE1. In such an embodiment, where the first timing controller 321 is the master MS, the first synch generator 321c is configured to determine the first original DE signal ODE1 as the first DE signal DE1.

The first synch generator 321c is configured to output the first DE signal DE1 to the second timing controller 322, which is the next timing controller thereof.

The second timing controller 322 may include a second control part 322a, a second memory 322b and a second synch generator 322c.

The second control part 322a is configured to receive a second original control signal OSS2 and second image data DATA_BIN from the external system. The second control part 322a is configured to store the second image data DATA_BIN at the second memory 322b based on a second original DE signal ODE2 of the second original control signal OSS2.

The second control part 322a is configured to receive the synch DE signal SDE from the third timing controller 323, which is the next timing controller thereof. The second control part 322a is configured to read out the second image data DATA_BOUT from the second memory 322b based on the synch DE signal SDE.

The second synch generator 322c is configured to generate a second DE signal DE2 based on the second original DE signal ODE2. In such an embodiment, where the second timing controller 322 is the first slave S1, the second synch generator 322c is configured to compare the second original DE signal ODE2 with the first DE signal DE1 received from the first timing controller 321. The second synch generator 322c is configured to determine an earlier signal of the second original DE signal ODE2 and the first DE signal DE1 as the second DE signal DE2.

Then, the second synch generator 322c is configured to output the second DE signal DE2 to the third timing controller 323, which is the next timing controller thereof.

The third timing controller 323 may include a third control part 323a, a third memory 323b and a third synch generator 323c.

The third control part 323a is configured to receive a third original control signal OSS3 and third image data DATA_CIN from the external system. The third control part 323a is configured to store the third image data DATA_CIN at the third memory 323b based on a third original DE signal ODE3 of the third original control signal OSS3.

The third control part 323a is configured to the synch DE signal SDE from the fourth timing controller 324, which is the next timing controller thereof. The third control part 323a is configured to read out the third image data DATA_COUT from the third memory 323b based on the synch DE signal SDE.

The third synch generator 323c is configured to generate a third DE signal DE3 based on the third original DE signal ODE3. In such an embodiment, where the third timing controller 323 is the second slave S2, the third synch generator 323c is configured to compare the third original DE signal ODE3 with the second DE signal DE2 received from the second timing controller 322. The third synch generator 323c is configured to determine the earlier signal of the third original DE signal ODE3 and the second DE signal DE2 as the third DE signal DE3.

Then, the third synch generator 323c is configured to output third DE signal DE3 to the fourth timing controller 324, which is the next timing controller thereof.

The fourth timing controller 324 may include a fourth control part 324a, a fourth memory 324b and a fourth synch generator 324c.

The fourth control part 324a is configured to receive a fourth original control signal OSS4 and fourth image data DATA_DIN from the external system. The fourth control part 324a is configured to store the fourth image data DATA_DIN at the fourth memory 324b based on a fourth original DE signal ODE4 of the fourth original control signal OSS4.

In such an embodiment, where the fourth timing controller 324 is the last slave, the fourth control part 324a is configured to the synch DE signal SDE from the fourth synch generator 324c. The fourth control part 324a is configured to read out the fourth image data DATA_DOUT from the fourth memory 324b based on the synch DE signal SDE.

The fourth synch generator 324c is configured to generate the synch DE signal SDE based on the fourth original DE signal ODE4. The fourth synch generator 324c is configured to compare the fourth original DE signal ODE4 with the third DE signal DE3 received from the third timing controller 323. The fourth synch generator 324*c* is configured to generate the synch DE signal SDE, which is delayed by the predetermined period LD from an earlier signal of the fourth original DE signal ODE4 and the third DE signal DE3.

Then, the fourth synch generator 324*c* is configured to output the synch DE signal SDE to the third timing controller 323, which is the previous timing controller thereof.

As described above, in an exemplary embodiment, the synch DE signal SDE is generated from the last slave, e.g., fourth timing controller 324, and then the synch DE signal SDE is sequentially transferred to the previous timing controllers thereof in the cascade mode, e.g., the third, second and first timing controllers 323, 322 and 321.

Therefore, the first, second, third and fourth timing controllers 321, 322, 323 and 324 may be in the data synchronization based on the synch DE signal SDE.

Figure 3:
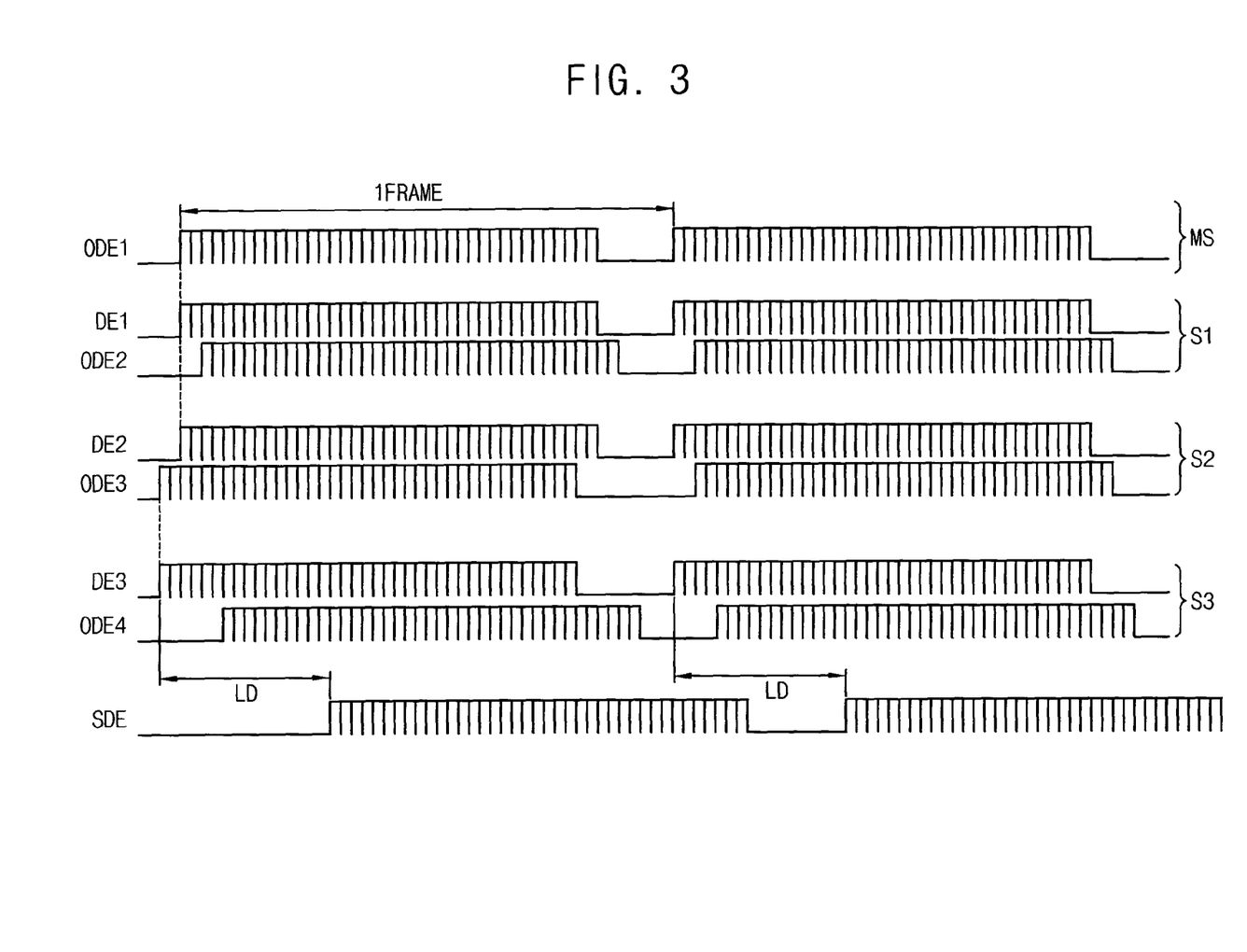
FIG. 3 is a timing chart illustrating an exemplary embodiment of a method of synchronizing data of the control driving module of FIG. 2.

FIG. 3 is a timing chart illustrating an exemplary embodiment of a method of synchronizing data of the control driving module of FIG. 2.

Referring to FIGS. 2 and 3, an exemplary embodiment of a method of generating the synch DE signal will be described in detail.

In an exemplary embodiment, the first control part 321*a* of the first timing controller 321, that is, the master MS, is configured to provide the first synch generator 321 with the first original DE signal ODE1 of the first original control signal OSS1 received from the external system.

In an exemplary embodiment, where the first timing controller 321 is the master, the first synch generator 321 is configured to determine the first original DE signal ODE1 as the first DE signal DE1 and to output the first DE signal DE1 to the second timing controller 322, which is the first slave S1.

The second control part 322*a* of the second timing controller 322, which is the first slave S1, is configured to provide the second synch generator 322*c* with the second original DE signal ODE2. The second synch generator 322*c* is configured to compare the second original DE signal ODE2 with the first DE signal DE1 and then to determine the first DE signal DE1, which is an earlier signal of the second original DE signal ODE2 and the first DE signal DE1, as the second DE signal DE2. The second synch generator 322*c* is configured to output the second DE signal DE2 to the second timing controller 323 that is the second slave S2.

The third control part 323*a* of the third timing controller 323, which is the second slave S2, is configured to provide the third synch generator 323*c* the third original DE signal ODE3. The third synch generator 323*c* is configured to compare the third original DE signal ODE3 with the second DE signal DE2 and then to determine the third original DE signal ODE3, which is an earlier signal of the third original DE signal ODE3 and the second DE signal DE2, as the third DE signal DE3. The third synch generator 323*c* is configured to output the third DE signal DE3 to the fourth timing controller 324, which is the third slave S3 and the last slave.

The fourth control part 324*a* of the fourth timing controller 324, which is the last slave, is configured to provide the fourth synch generator 324*c* with the fourth original DE signal ODE4. The fourth synch generator 324*c* is configured to compare the fourth original DE signal ODE4 with the third DE signal DE3, and then to generate the synch DE signal SDE, which is delayed by a predetermined period LD (shown in FIG. 4) from the third DE signal DE3. The third DE signal DE3 is an earlier signal of the fourth original DE signal ODE4 and the third DE signal DE3.

In such an embodiment, where the fourth timing controller 324 is the last slave, the fourth timing controller 324 is configured to sequentially transfer the synch DE signal SDE to the third, second and first timing controllers 323, 322 and 321 in the cascade mode.

Therefore, the first, second, third and fourth timing controllers 321, 322, 323 and 324 may be synchronized with the synch DE signal SDE.

Figure 4:
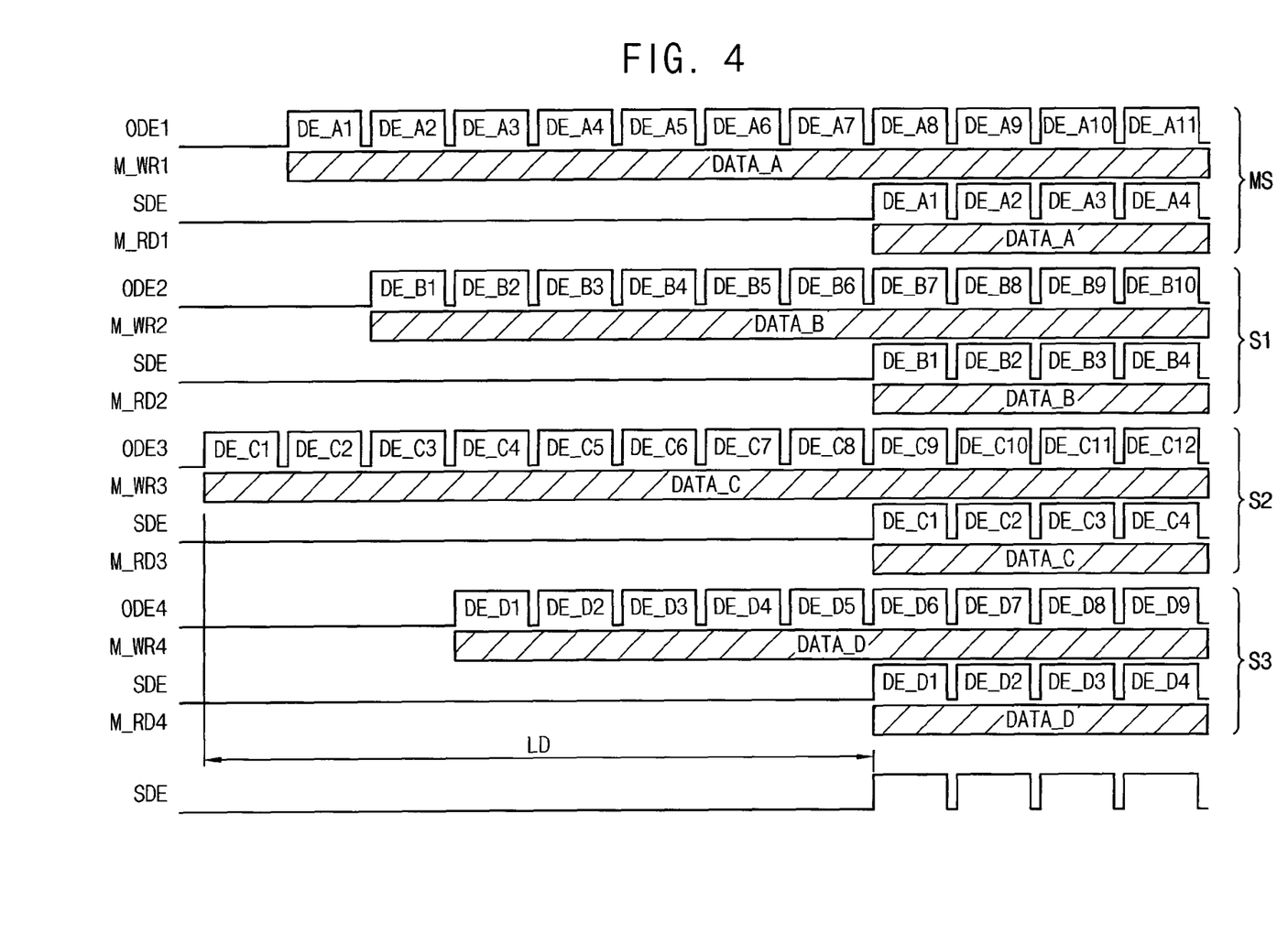
FIG. 4 is a timing chart illustrating an exemplary embodiment of a method of controlling a memory of the control driving module of FIG. 2.

FIG. 4 is a timing chart illustrating an exemplary embodiment of a method of controlling a memory of the control driving module of FIG. 2.

Referring to FIGS. 1 to 4, the first control part 321*a* of the first timing controller 321, which is the master MS, is configured to write the first image data DATA_A at the first memory 321*b* by a horizontal line, e.g., for each horizontal line or on a horizontal-line-by-horizontal-line basis, in synchronization with the first original DE signal ODE1 (M_WR1).

The second control part 322*a* of the second timing controller 322, which is the first slave S1, is configured to write the second image data DATA_B at the second memory 322*b* by the horizontal line in synchronization with the second original DE signal ODE2 (M_WR2).

The third control part 323*a* of the third timing controller 323, which is the second slave S2, is configured to write the third image data DATA_C at the third memory 323*b* by the horizontal line in synchronization with the third original DE signal ODE3 (M_WR3).

The fourth control part 324*a* of the fourth timing controller 324, which is the third slave S3 and the last slave, is configured to write the fourth image data DATA_D at the fourth memory 324*b* by the horizontal line in synchronization with the fourth original DE signal ODE4 (M_WR4).

Then, the fourth timing controller 324 of the last slave S3 is configured to transfer the synch DE signal SDE generated from therein to the third, second and first timing controllers 323, 322 and 321 in the cascade mode.

Therefore, the first control part 321*a* of the first timing controller 321 is configured to read out the first image data DATA_A from the first memory 321*b* by the horizontal line in synchronization with the synch DE signal SDE (M_RD1).

The second control part 322*a* of the second timing controller 322 is configured to read out the second image data DATA_B from the second memory 322*b* by the horizontal line in synchronization with the synch DE signal SDE (M_RD2).

The third control part 323*a* of the third timing controller 323 is configured to read out the third image data DATA_C from the third memory 323*b* by the horizontal line in synchronization with the synch DE signal SDE (M_RD3).

The fourth control part 324*a* of the fourth timing controller 324 is configured to read out the fourth image data DATA_D from the fourth memory 324*b* by the horizontal line in synchronization with the synch DE signal SDE (M_RD4).

As described above, in an exemplary embodiment, the first, second, third and fourth timing controllers 321, 322, 323 and 324 is configured to provide the first, second, third and fourth source driving circuits 211, 212, 213 and 214 with the first, second, third and fourth image data DATA_A, DATA_B, DATA_C and DATA_D by the horizontal line in synchronization with the synch DE signal SDE.

The first, second, third and fourth source driving circuits 211, 212, 213 and 214 are configured to display an image on the display panel 100 using the first, second, third and fourth image data DATA_A, DATA_B, DATA_C and DATA_D.

Therefore, in such an embodiment, the timing controllers are synchronized with each other by the synch DE such that a display quality of a high-resolution image may be improved.

Figure 5:
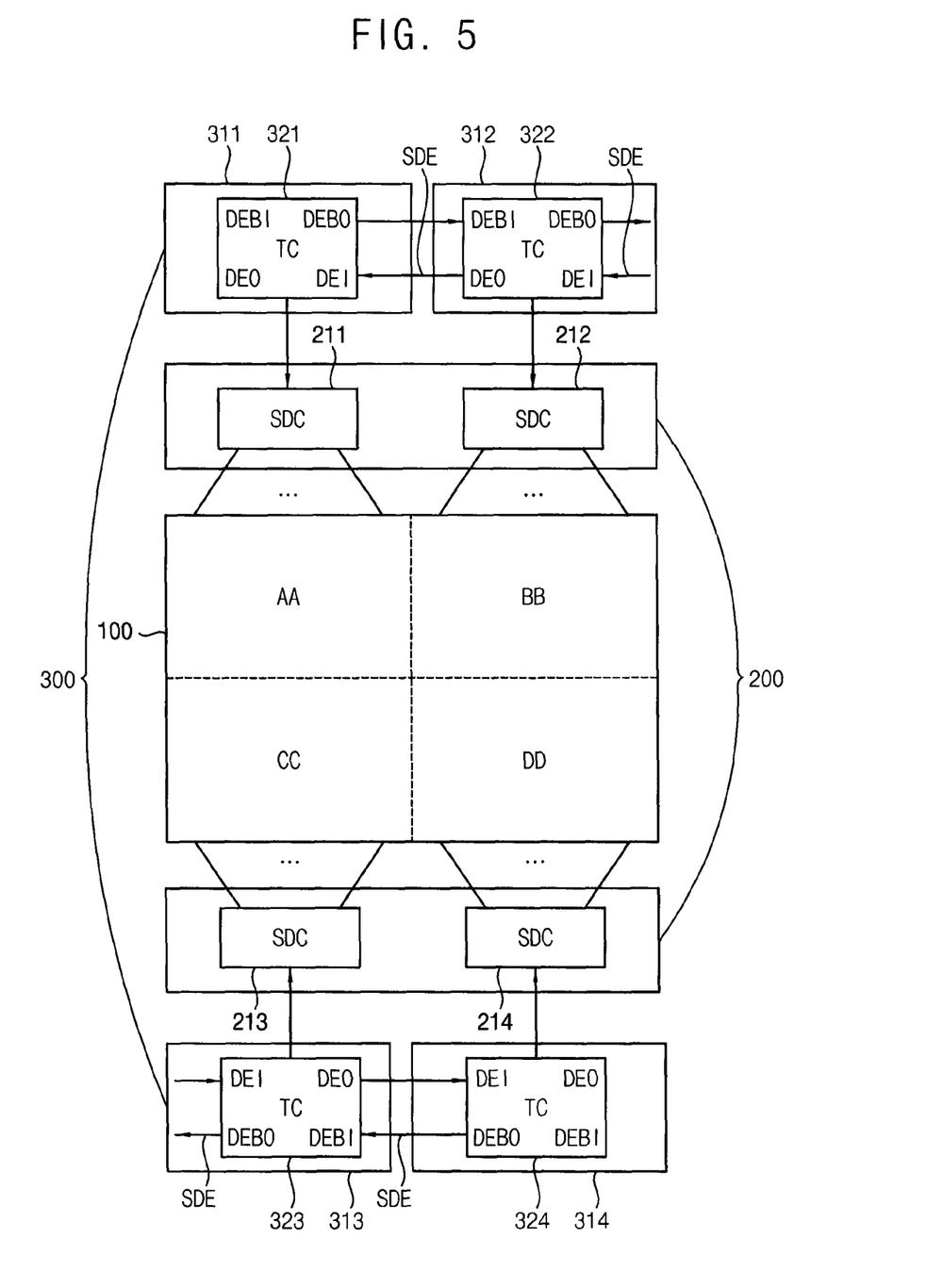
FIG. 5 is a block diagram illustrating an alternative exemplary embodiment of a display apparatus according to the invention.

FIG. 5 is a block diagram illustrating an alternative exemplary embodiment of a display apparatus according to the invention.

Hereinafter, the same or like elements shown in FIG. 5 have been labeled with the same reference characters as used above to describe the exemplary embodiments of the display apparatus described above, and any repetitive detailed description thereof will hereinafter be omitted or simplified.

Referring to FIG. 5, an exemplary embodiment of the display apparatus may include a display panel 100, a source driving module 200 and a control driving module 300.

The display panel 100 includes a plurality of display blocks, e.g., a first display block AA, a second display block BB, a third display block CC and a fourth display block DD. The display blocks AA, BB, CC and DD are arranged substantially in a matrix form.

In one exemplary embodiment, for example, as shown in FIG. 5, the display blocks AA, BB, CC and DD may be arranged in a 2×2 matrix form. In an exemplary embodiment, each of the display blocks AA, BB, CC and DD may have a high-resolution higher than a FHD resolution. In such an embodiment, where each of the display blocks AA, BB, CC and DD has the FHD resolution, the display panel 100 has the high-resolution being four times than the FHD resolution.

The source driving module 200 may include a plurality of source driving circuits, e.g., a first source driving circuit 211, a second source driving circuit 212, a third source driving circuit 213 and a fourth source driving circuit 214, to respectively drive the display blocks AA, BB, CC and DD. In one exemplary embodiment, for example, the first source driving circuit 211 is configured to provide a plurality of data lines of the first display block AA with a plurality of data signals, the second source driving circuit 212 is configured to provide a plurality of data lines of the second display block BB with a plurality of data signals, the third source driving circuit 213 is configured to provide a plurality of data lines of the third display block CC with a plurality of data signals, and the fourth source driving circuit 214 is configured to provide a plurality of data lines of the fourth display block DD with a plurality of data signals. Each of the source driving circuits 211, 212, 213 and 214 may include a source driver integrated circuit.

The control driving module 300 may include a plurality of timing controllers, e.g., a first timing controller 321, a second timing controller 322, a third timing controller 323 and a fourth timing controller 324, and a plurality of printed circuit boards, e.g., a first printed circuit board 311, a second printed circuit board 312, a third printed circuit board 313 and a fourth printed circuit board 314, on which includes the plurality of timing controllers 321, 322, 323 and 324 are respectively disposed.

In one exemplary embodiment, for example, as shown in FIG. 5, the first timing controller 321 is disposed on the first printed circuit board 311 and is configured to drive the first source driving circuit 211 such that the first display block AA displays an image. The first timing controller 321 is configured to receive first image data and a first original control signal corresponding to the first display block AA.

The second timing controller 322 is disposed on the second printed circuit board 312 and is configured to drive the second source driving circuit 212. The second timing controller 322 is configured to receive second image data and a second original control signal corresponding to the second display block BB.

The third timing controller 323 is disposed on the third printed circuit board 313 and is configured to drive the third source driving circuit 213. The third timing controller 323 is configured to receive third image data and a third original control signal corresponding to the third display block CC.

The fourth timing controller 324 is disposed on the fourth printed circuit board 314 and is configured to drive the fourth source driving circuit 214. The fourth timing controller 324 is configured to receive fourth image data and a fourth original control signal corresponding to the fourth display block DD.

In an exemplary embodiment, for data synchronization, a master timing controller, e.g., the first timing controller 321, of the timing controllers 321, 322, 323 and 324 is configured to output an original DE signal to a first slave timing controller, e.g., the second timing controller 322. Each of other slave timing controllers, e.g., the third and fourth timing controllers 323 and 324, is configured to output an earlier signal of a DE signal and an original DE signal received from a previous slave timing controller to a next slave timing controller. A last slave timing controller 324 is configured to generate a synch DE signal SDE, which is delayed by a predetermined period LD from an earlier signal of a DE signal and an original DE signal received from the previous slave timing controller, and to sequentially transfer the synch DE signal SDE to the previous timing controllers 323, 322 and 321 in a cascade mode. The timing controllers 321, 322, 323 and 324 may perform the data synchronization based on the synch DE signal SDE.

Therefore, the timing controllers 321, 322, 323 and 324 may be achieved the data synchronization using the synch DE signal SDE based on the earliest signal among the original DE signals received during a frame period.

In such an embodiment, the timing controller TC may include a first input pin DEI, which is configured to receive a DE signal from a previous timing controller, a first output pin DEO, which is configured to output a DE signal to a next timing controller, a second input pin DEBI, which is configured to receive the synch DE signal from the next timing controller and a second output pin DEBO, which is configured to output the synch DE signal to the previous timing controller.

According to an exemplary embodiment, as described above, the timing controller TC may achieve the data synchronization only using the first and second input pins DEI and DEBI and the first and second output pins DEO and DEBO. Therefore, in such an embodiment, a number of the pin of the timing controller TC may be decreased, such that a circuit design of the control driving module 300 may be simplified.

Figure 6:
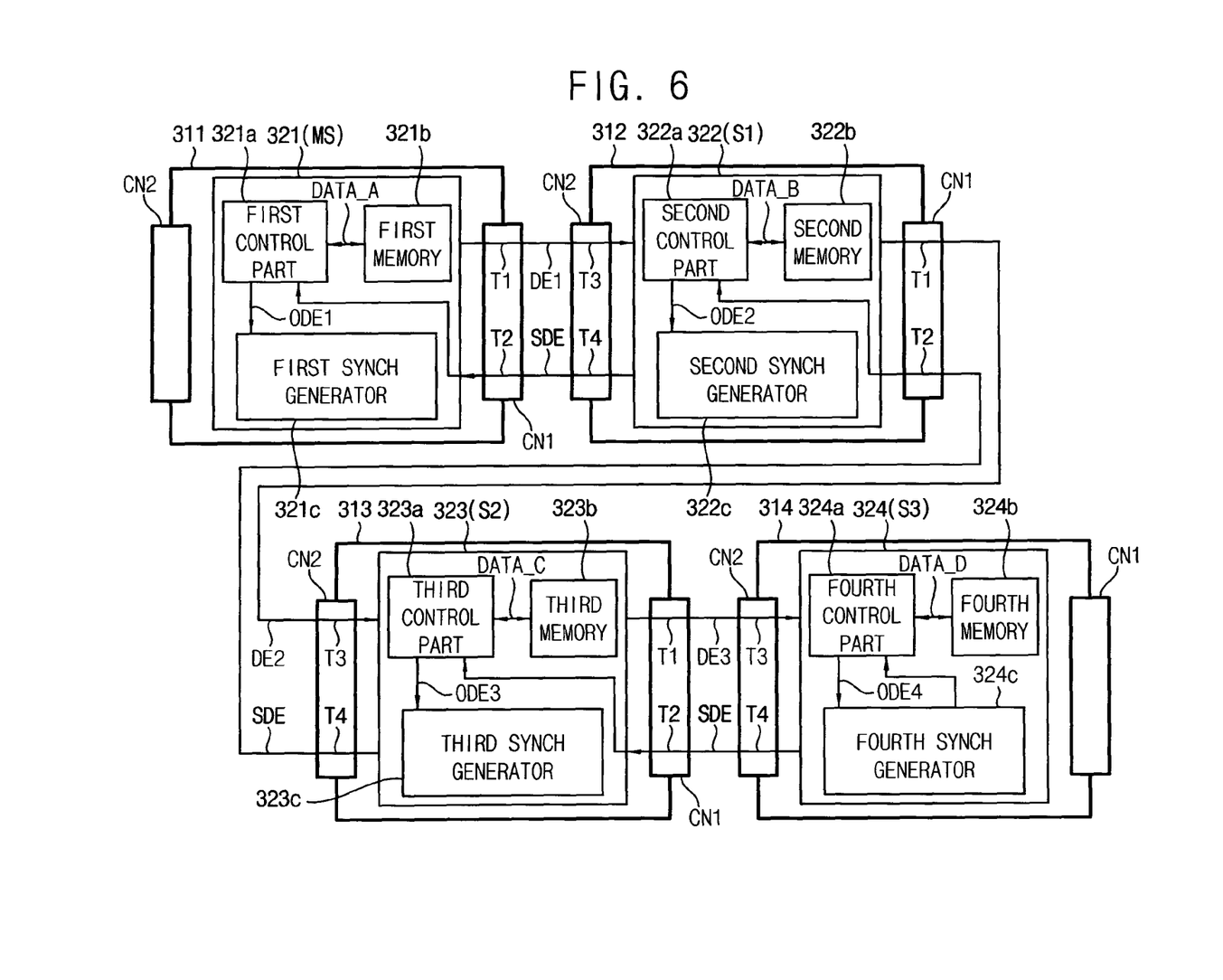
FIG. 6 is a block diagram illustrating an exemplary embodiment of a control driving module of FIG. 5.

FIG. 6 is a block diagram illustrating an exemplary embodiment of a control driving module of FIG. 5.

Referring to FIGS. 5 and 6, an exemplary embodiment of the control driving module 300 may include a plurality of timing controllers 321, 322, 323 and 324 and a plurality of printed circuit boards 311, 312, 313 and 314, on which the plurality of timing controllers 321, 322, 323 and 324 is respectively disposed.

In such an embodiment, each of the printed circuit boards 311, 312, 313 and 314 includes a first connector CN1 and a second connector CN2.

The first connector CN1 is connected to a next printed circuit board. The first connector CN1 includes a first output terminal T1, which is configured to output a DE signal to the next printed circuit board, and a first input terminal T2, which is configured to receive a synch DE signal SDE from the next printed circuit board.

The second connector CN2 is connected to a previous printed circuit board. The second connector CN2 include a second input terminal T3, which is configured to receive the DE signal from the previous printed circuit board, and a second output terminal T4 is configured to output the synch DE signal SDE to the previous printed circuit board.

In one exemplary embodiment, for example, a first timing controller 321 is disposed on the first printed circuit board 311.

The first timing controller 321 may include a first control part 321a, a first memory 321b and a first synch generator 321c.

The first control part 321a is configured to store the first image data DATA_A at the first memory 321b based on a first original DE signal ODE1. The first control part 321a is configured to receive the synch DE signal SDE from the second timing controller 322, which is the next timing controller thereof. The first control part 321a is configured to read out the first image data DATA_A from the first memory 321b based on the synch DE signal SDE.

In an exemplary embodiment, the first timing controller 321 is the master MS, and the first synch generator 321c is configured to determine the first original DE signal ODE1 as the first DE signal DE1 and then to output the first DE signal DE1 to the second timing controller 322.

The first connector CN1 of the first printed circuit board 321 is connected to the second connector CN2 of the second printed circuit board 322.

The first DE signal DE1 is transferred through the first output terminal T1 of the first connector CN1, which is connected to the first printed circuit board 321, and the second input terminal T3 of the second connector CN2, which is connected to the second printed circuit board 322. The synch DE signal SDE is transferred through the second output terminal T4 of the second connector CN2, which is connected to the second printed circuit board 322, and the first input terminal T2 of the first connector CN1, which is connected to the first printed circuit board 321.

In such an embodiment, the second timing controller 322 is disposed on the second printed circuit board 312.

The second timing controller 322 may include a second control part 322a, a second memory 322b and a second synch generator 322c.

The second control part 322a is configured to store the second image data DATA_B at the second memory 322b based on a second original DE signal ODE2.

The second control part 322a is configured to receive the synch DE signal SDE from the third timing controller 323, which is the next timing controller thereof. The second control part 322a is configured to read out the second image data DATA_B from the second memory 322b based on the synch DE signal SDE.

In such an embodiment, the second timing controller 322 is the first slave S1, and the second synch generator 322c is configured to determine an earlier signal of the second original DE signal ODE2 and the first DE signal DE1 as a second DE signal DE2. The second synch generator 322c is configured to output the second DE signal DE2 to the third timing controller 323, which is the next timing controller thereof.

The first connector CN1 of the second printed circuit board 312 is connected to the second connector CN2 of the third printed circuit board 313. The second connector CN2 of the second printed circuit board 312 is connected to the first connector CN1 of the first printed circuit board 311.

The second DE signal DE2 is transferred through the first output terminal T1 of the first connector CN1, which is connected to the second printed circuit board 312, and the second input terminal T3 of the second connector CN2, which is connected to the third printed circuit board 313. The synch DE signal SDE is transferred through the second output terminal T4 of the second connector CN2, which is connected to the third printed circuit board 313, and the first input terminal T2 of the first connector CN1, which is connected to the second printed circuit board 312.

In such an embodiment, the third timing controller 323 is disposed on the third printed circuit board 313.

The third timing controller 323 may include a third control part 323a, a third memory 323b and a third synch generator 323c.

The third control part 323a is configured to store the third image data DATA_C at the third memory 323b based on a third original DE signal ODE3.

The third control part 323a is configured to receive the synch DE signal SDE from the fourth timing controller 324, which is the next timing controller thereof. The third control part 323a is configured to read out the third image data DATA_C from the third memory 323b based on the synch DE signal SDE.

When the third timing controller 323 is the second slave S2, the third synch generator 323c is configured to determine an earlier signal of the third original DE signal ODE3 and the second DE signal DE2 as a third DE signal DE3. The third synch generator 323c is configured to output the third DE signal DE3 to the fourth timing controller 324, which is the next timing controller thereof.

The first connector CN1 of the third printed circuit board 313 is connected to the second connector CN2 of the fourth printed circuit board 314. The second connector CN2 of the third printed circuit board 313 is connected to the first connector CN1 of the second printed circuit board 312.

The third DE signal DE3 is transferred through the first output terminal T1 of the first connector CN1, which is connected to the third printed circuit board 313, and the second input terminal T3 of the second connector CN2, which is connected to the fourth printed circuit board 314. The synch DE signal SDE is transferred through the second output terminal T4 of the second connector CN2, which is connected to the fourth printed circuit board 314, and the first input terminal T2 of the first connector CN1, which is connected to the third printed circuit board 313.

In such an embodiment, the fourth timing controller 324 is disposed on the fourth printed circuit board 314.

The fourth timing controller 324 may include a fourth control part 324a, a fourth memory 324b and a fourth synch generator 324c.

The fourth control part 324a is configured to store the fourth image data DATA_D at the fourth memory 324b based on a fourth original DE signal ODE4.

In such an embodiment, the fourth timing controller 324 is the last slave S3, and the fourth control part 324a is configured to the synch DE signal SDE from the fourth synch generator 324c. The fourth control part 324a is configured to read out the fourth image data DATA_D from the fourth memory 324b based on the synch DE signal SDE.

The fourth synch generator 324c is configured to generate the synch DE signal SDE which is delayed by a predetermined period LD from an earlier signal of the fourth original DE signal ODE4 and the third DE signal DE3. The fourth synch generator 324c is configured to output the synch DE signal SDE to the third timing controller 323.

The second connector CN2 of the fourth printed circuit board 314 is connected to the first connector CN1 of the third printed circuit board 313.

The synch DE signal SDE is transferred through the second output terminal T4 of the second output terminal T4, which is connected to the fourth printed circuit board 314, and the first input terminal T2 of the first connector CN1, which is connected to the third printed circuit board 313.

As described above, in an exemplary embodiment, the synch DE signal SDE is generated from fourth timing controller 324, which is the last slave, and then the synch DE signal SDE is sequentially transferred to the third, second and first timing controllers 323, 322 and 321, which are the previous timing controllers of the last slave, in the cascade mode.

Therefore, in such an embodiment, the first, second, third and fourth timing controllers 321, 322, 323 and 324 may be achieved the data synchronization based on the synch DE signal SDE.

According to an exemplary embodiment, as described above, the timing controller TC may be achieved the data synchronization only using the first and second input pins DEI and DEBI and the first and second output pins DEO and DEBO. Therefore, a number of the pin of the timing controller TC may be decreased.

According to an exemplary embodiment, the first, second, third and fourth timing controllers 321, 322, 323 and 324 are respectively disposed on the printed circuit boards 311, 312, 313 and 314. Thus, the number of the pin of the timing controller TC may be decreased such that a number of the terminal of the connector which connects between adjacent printed circuit boards may be decreased and a circuit design of the control driving module 300 may be simplified.

Figure 7:
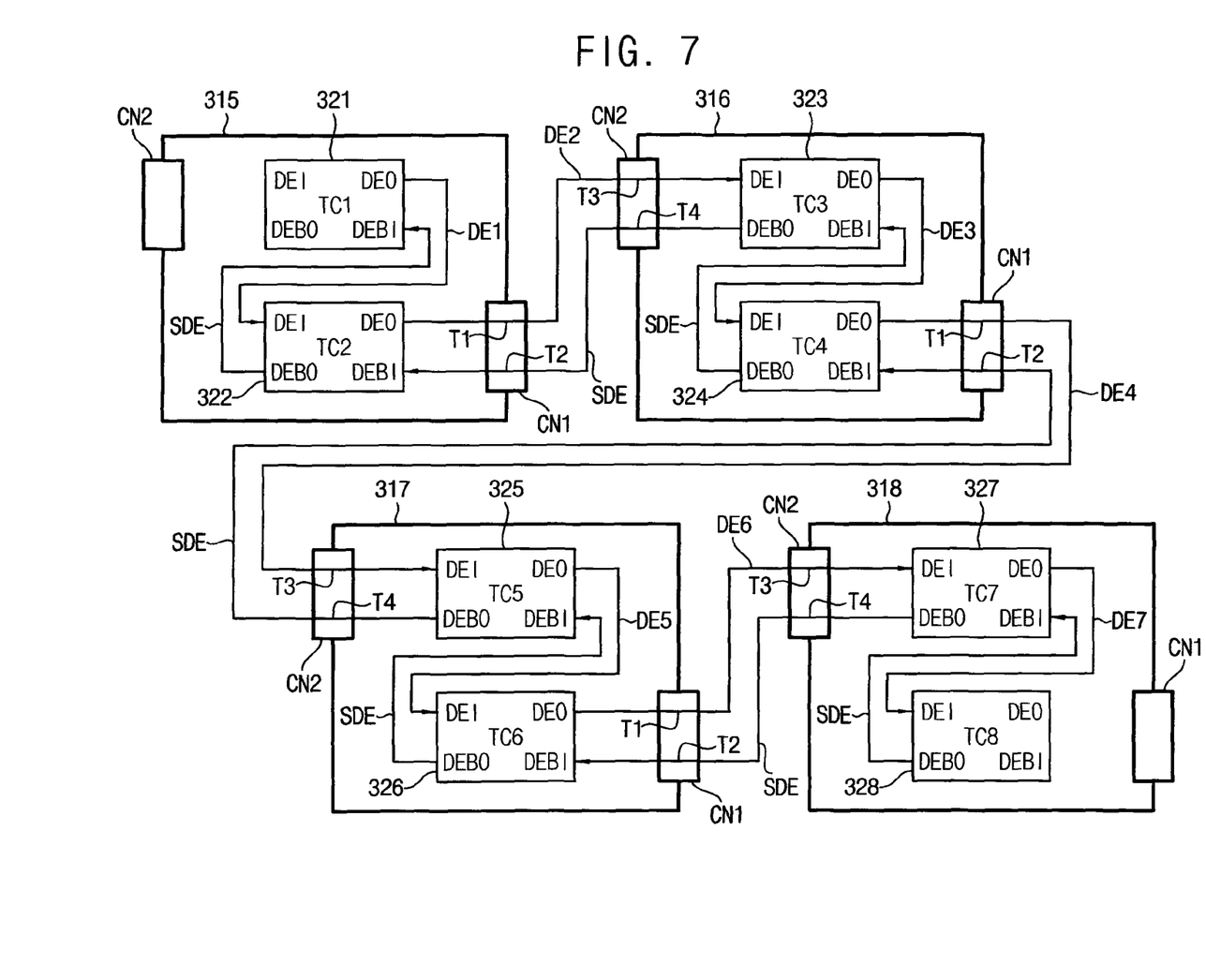
FIG. 7 is a block diagram illustrating an exemplary embodiment of a control driving module according to the invention.

FIG. 7 is a block diagram illustrating an exemplary embodiment of a control driving module according to the invention.

Hereinafter, the same or like elements shown in FIG. 7 have been labeled with the same reference characters as used above to describe the exemplary embodiments of the control driving module described above, and any repetitive detailed description thereof will hereinafter be omitted or simplified.

Referring to FIGS. 5, 6 and 7, an exemplary embodiment of the control driving module 300 may include a plurality of timing controllers, e.g., a first timing controller 321, a second timing controller 322, a third timing controller 323, a fourth timing controller 324, a fifth timing controller 325, a sixth timing controller 326, a seventh timing controller 327 and an eighth timing controller 328, and a plurality of printed circuit boards, e.g., a first printed circuit board 315, a second first printed circuit board 316, a third first printed circuit board 317 and a fourth first printed circuit board 318, on the plurality of timing controllers 321, 322, 323, 324, 325, 326, 327 and 328 is disposed.

In an exemplary embodiment, as shown in FIG. 7, the first and second timing controllers 321 and 322 are disposed on the first printed circuit board 315, the third and fourth timing controllers 323 and 324 are disposed on the second printed circuit board 316, the fifth and sixth timing controllers 325 and 326 are disposed on the third printed circuit board 317, and the seventh and eighth timing controllers 327 and 328 are disposed on the fourth printed circuit board 318.

In such an embodiment, referring back to FIG. 5, the first and second timing controllers 321 and 322 disposed on the first printed circuit board 315 is configured to drive the first source driving circuit 211 to display an image on the first display block AA. The third and fourth timing controllers 323 and 324 disposed on the second printed circuit board 316 is configured to drive the second source driving circuit 212 to display an image on the second display block BB. The fifth and sixth timing controllers 325 and 326 disposed on the third printed circuit board 317 is configured to drive the third source driving circuit 213 to display an image on the third display block CC. The fifth and sixth timing controllers 325 and 326 disposed on the third printed circuit board 317 is configured to drive the third source driving circuit 213 to display an image on the third display block CC. The seventh and eighth timing controllers 327 and 328 disposed on the fourth printed circuit board 318 is configured to drive the fourth source driving circuit 214 to display an image on the fourth display block DD.

Therefore, in such an embodiment, where each timing controller is configured to drive a display block of the FHD resolution, the control driving module 300 may be drive the display panel having a high-resolution being eight times than the FHD resolution.

In an exemplary embodiment, where the display panel has a high-resolution that is about 16 times the FHD resolution, each printed circuit board may include 4 timing controllers disposed thereon. Therefore, a number of the printed circuit board and a number of the timing controller disposed on each printed circuit board may be variously set based on the resolution of the display panel.

In such an embodiment, the timing controller TC may have substantially the same structure as the timing controllers described above, and any repetitive detailed description thereof will be omitted.

In an exemplary embodiment, as shown in FIG. 7, each of the first to fourth printed circuit boards 315, 316, 317 and 318 may include a first connector CN1 and a second connector CN2.

In such an embodiment, the first and second connectors CN1 and CN2 may have substantially the same structure as the connectors described above, and any repetitive detailed description thereof will be omitted.

In one exemplary embodiment, for example, the first timing controller 321 may be a master, and remaining second to eighth timing controllers 322, 323, 324, 325, 326, 327 and 328 may be first to seventh slaves, respectively. Thus, the eighth timing controller 328 may be a last slave that is configured to generate a synch DE signal.

In such an embodiment, for data synchronization, the first timing controller 321 is configured to write first image data at a first memory based on a first original DE signal. The first timing controller 321 is configured to determine the first original DE signal as a first DE signal DE1. The first timing controller 321 is configured to output the first DE signal DE1 through a first output pin DEO.

The second timing controller 322 is configured to receive the first DE signal DE1 through a first input pin DEI. The second timing controller 322 is configured to write second image data at a second memory based on a second original DE signal. The second timing controller 322 is configured to determine an earlier signal of the second original DE signal and the first DE signal DE1 as a second DE signal DE2. The second timing controller 322 is configured to output the second DE signal DE2 through a first output pin DEO.

The second DE signal DE2 is transferred through a first output terminal T1 of a first connector CN1, which is disposed on the first printed circuit board 315, and a second input terminal T3 of a second connector CN2, which is disposed on the second printed circuit board 316.

The third timing controller 323 is configured to receive the second DE signal DE2 through a first input pin DEI. The third timing controller 323 is configured to write third image data at third memory based on a third original DE signal. The third timing controller 323 is configured to determine an earlier signal of the third original DE signal and the second DE signal DE2 as a third DE signal DE3. The third timing controller 323 is configured to output the third DE signal DE3 through a first output pin DEO.

The fourth timing controller 324 is configured to receive the third DE signal DE3 through a first input pin DEI. The fourth timing controller 324 is configured to write fourth image data at a fourth memory based on a fourth original DE signal. The fourth timing controller 324 is configured to determine an earlier signal of the fourth original DE signal and the third DE signal DE3 as a fourth DE signal DE4. The fourth timing controller 324 is configured to output the fourth DE signal DE4 through a first output pin DEO.

The fourth DE signal DE4 is transferred through a first output terminal T1 of a first connector CN1, which is disposed on the second printed circuit board 316, and a second input terminal T3 of a second connector CN2, which is disposed on the third printed circuit board 317.

The fifth timing controller 325 is configured to receive the fourth DE signal DE4 through a first input pin DEI. The fifth timing controller 325 is configured to write fifth image data at a fifth memory based on a fifth original DE signal. The fifth timing controller 325 is configured to determine an earlier signal of the fifth original DE signal and the fourth DE signal DE4 as a fifth DE signal DE5. The fifth timing controller 325 is configured to output the fifth DE signal DE5 through a first output pin DEO.

The sixth timing controller 326 is configured to receive the fifth DE signal DE5 through a first input pin DEI. The sixth timing controller 326 is configured to write sixth image data at a sixth memory based on a sixth original DE signal. The sixth timing controller 326 is configured to determine an earlier signal of the sixth original DE signal and the fifth DE signal DE5 as a sixth DE signal DE6. The sixth timing controller 326 is configured to output the first output pin DEO through a sixth DE signal DE6.

The sixth DE signal DE6 is transferred through a first output terminal T1 of a first connector CN1, which is disposed on the third printed circuit board 317, and a second input terminal T3 of a second connector CN2, which is disposed on the fourth printed circuit board 318.

The seventh timing controller 327 is configured to receive the sixth DE signal DE6 through a first input pin DEI. The seventh timing controller 327 is configured to write seventh image data at a seventh memory based on a seventh original DE signal. The seventh timing controller 327 is configured to determine an earlier signal of the seventh original DE signal and the sixth DE signal DE6 as a seventh DE signal DE7. The seventh timing controller 327 is configured to output the seventh DE signal DE7 through a first output pin DEO.

The eighth timing controller 328 is configured to receive the seventh DE signal DE7 through a first input pin DEI. The eighth timing controller 328 is configured to write eighth image data at a seventh memory based on an eighth original DE signal. The eighth timing controller 328 is configured to generate a synch DE signal SDE which is delayed by a predetermined period from an earlier signal of the eighth original DE signal and the seventh DE signal DE7. The eighth timing controller 328 is configured to read out the eighth image data from the eighth memory based on the synch DE signal SDE. Then, the eighth timing controller 328 is configured to the synch DE signal SDE through a second output pin DEBO.

The synch DE signal SDE is sequentially transferred to the seventh, sixth, fifth, fourth, third, second and first timing controllers 327, 326, 325, 324, 323, 322 and 321, that is, the previous timing controllers of the last slave, in the cascade mode.

In an exemplary embodiment, as shown in FIG. 7, the seventh timing controller 327 is configured to receive the synch DE signal SDE through a second input pin DEBI and output the synch DE signal SDE through a second output pin DEBO. The seventh timing controller 327 is configured to read out the seventh image data from the seventh memory based on the synch DE signal SDE.

The sixth timing controller 326 is configured to receive the synch DE signal SDE through a second input pin DEBI and output the synch DE signal SDE through a second output pin DEBO. The sixth timing controller 326 is configured to read out the sixth image data from the sixth memory based on the synch DE signal SDE.

The fifth timing controller 325 is configured to receive the synch DE signal SDE through a second input pin DEBI and output the synch DE signal SDE through a second output pin DEBO. The fifth timing controller 325 is configured to read out the fifth image data from the fifth memory based on the synch DE signal SDE.

The fourth timing controller 324 is configured to receive the synch DE signal SDE through a second input pin DEBI and output the synch DE signal SDE through a second output pin DEBO. The fourth timing controller 324 is configured to read out the fourth image data from the fourth memory based on the synch DE signal SDE.

The third timing controller 323 is configured to receive the synch DE signal SDE through a second input pin DEBI and output the synch DE signal SDE through a second output pin DEBO. The third timing controller 323 is configured to read out the third image data from the third memory based on the synch DE signal SDE.

The second timing controller 322 is configured to receive the synch DE signal SDE through a second input pin DEBI and output the synch DE signal SDE through a second output pin DEBO. The second timing controller 322 is configured to read out the second image data from the second memory based on the synch DE signal SDE.

The first timing controller 321 is configured to receive the synch DE signal SDE through a second input pin DEBI and output the synch DE signal SDE through a second output pin DEBO. The first timing controller 321 is configured to read out the first image data from the first memory based on the synch DE signal SDE.

In such an embodiment, as described above, the synch DE signal SDE, which is delayed by a predetermined period from the earliest signal among first to eighth original DE signals, is generated, and then the first to eighth timing controllers 321, 322, 323, 324, 325, 326, 327 and 328 control, e.g., synchronize, image data thereof based on the synch DE signal. Thus, the first to eighth timing controllers 321, 322, 323, 324, 325, 326, 327 and 328 may be achieved the data synchronization. Therefore, a display quality of a high-resolution image may be improved by the data synchronization.

In an exemplary embodiment, the timing controller TC may be achieved the data synchronization only using the first and second input pins DEI and DEBI and the first and second output pins DEO and DEBO. Therefore, a number of the pin of the timing controller TC may be decreased, such that a circuit design of the control driving module 300 may be simplified.

In an exemplary embodiment, the number of the pin of the timing controller TC may be decreased such that a number of the terminal of the connector which connects between adjacent printed circuit boards may be decreased.

According to exemplary embodiments of the invention, the plurality of timing controllers is synchronized based on the synch DE signal, which is delayed by a predetermined period from the earliest signal among the original DE signals of the timing controllers, such that the data synchronization of the timing controllers may be achieved. Therefore, a display quality of a high-resolution image may be improved by the data synchronization. In such an embodiment, the timing controller TC may be achieved the data synchronization only using two input pins and two output pins. Thus, the number of the pin of the timing controller may be decreased and the number of the terminal of the connector which connects between adjacent printed circuit boards may be decreased. Therefore, the circuit design of the control driving module may be simplified.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of synchronizing a driving module, the method comprising:
   applying a plurality of original data enable signals, each of which is from an external system of the driving module, to a plurality of timing controllers of the driving module, respectively;
   generating a synch data enable signal from the driving module based on the earliest signal among the original data enable signals; and
   transferring the synch data enable signal to the timing controllers in a cascade mode.

2. The method of claim 1, wherein a master timing controller of the timing controllers is configured to determine an original data enable signal applied thereto as a first data enable signal, and to transfer the first data enable signal to a slave timing controller of the timing controllers.

3. The method of claim 2, wherein a first slave timing controller of the timing controllers is configured to determine an earlier signal of an original data enable signal applied thereto and the first data enable signal as a second data enable signal, and to transfer the second data enable signal to a second slave timing controller of the timing controller.

4. The method of claim 3, wherein a last slave timing controller of the timing controllers is configured to generate the synch data enable signal, which is delayed by a predetermined period from an earlier signal of an original data enable signal applied thereto and a data enable signal received from a previous slave timing controller thereof.

5. The method of claim 4, wherein the last slave timing controller is configured to transfer the synch data enable signal to a plurality of previous timing controllers thereof in the cascade mode.

6. The method of claim 1, wherein each of the timing controllers is configured to write image data at a memory thereof based on the original data enable signal applied thereto, and read out the image data from the memory based on the synch data enable signal.

7. The method of claim 1, wherein the synch data enable signal is generated once during a frame period.

8. A display apparatus comprising:
   a driving module comprising a plurality of timing controllers,
   wherein the driving module is configured to generate a synch data enable signal based on the earliest signal among a plurality of original data enable signals, each of which is applied from an external system of the driving module, to the timing controllers, respectively, and to transfer the synch data enable signal to the timing controllers in a cascade mode; and
   a display panel configured to display an image on a plurality of display blocks thereof based on a control by the timing controllers, which are synchronized with each other based on the synch data enable signal.

9. The display apparatus of claim 8, wherein a master timing controller of the timing controllers is configured to determine an original data enable signal applied thereto as a first data enable signal, and to transfer the first data enable signal to a slave timing controller of the timing controllers.

10. The display apparatus of claim 9, wherein a first slave timing controller of the timing controllers is configured to determine an earlier signal of an original data enable signal applied thereto and the first data enable signal as a second data enable signal, and to transfer the second data enable signal to a second slave timing controller of the timing controllers.

11. The display apparatus of claim 9, wherein a last slave timing controller of the timing controllers is configured to generate the synch data enable signal, which is delayed by a predetermined period from an earlier signal of an original data enable signal applied thereto and a data enable signal received from a previous slave timing controller thereof.

12. The display apparatus of claim 11, wherein the last slave timing controller of the timing controllers is configured to transfer the synch data enable signal to a plurality of a plurality of previous timing controllers thereof in the cascade mode.

13. The display apparatus of claim 8, wherein
   each of the timing controllers comprises a memory, and
   each of the timing controllers is configured to write image data at the memory thereof based on the original data enable signal applied thereto, and to read out the image data from the memory based on the synch data enable signal.

14. The display apparatus of claim 8, wherein each of the timing controllers comprises:
   a first input pin configured to receive a data enable signal of a previous slave timing controller;
   a first output pin configured to output a data enable signal thereof to a next slave timing controller;
   a second input pin configured to receive the synch data enable signal from the next slave timing controller; and
   a second output pin configured to output the synch data enable signal to the previous slave timing controller.

15. The display apparatus of claim 8, wherein the driving module further comprises a printed circuit board, on which a timing controller of the timing controllers is disposed.

16. The display apparatus of claim 8, wherein
the driving module further comprises a plurality of printed circuit boards, on which the timing controllers are disposed,
each of the printed circuit boards comprise a first connector and a second connector,
the first connector of a printed circuit board is connected to the second connector of a next printed circuit board, and
the second connector of the printed circuit board is connected to the first connector of a previous printed circuit board.

17. The display apparatus of claim 16, wherein
the first connector comprises:
 a first output terminal configured to output a data enable signal; and
 a first input terminal configured to receive the synch data enable signal, and
the second connector comprises:
 a second input terminal configured to receive a data enable signal; and
 a second output terminal configured to output the synch data enable signal.

18. The display apparatus of claim 8, wherein
the display blocks extend substantially in a first direction, which is an extending direction of a data line in the display panel, and
the display blocks are arranged substantially in a second direction, which is an extending direction of a gate line in the display panel.

19. The display apparatus of claim 8, wherein the display blocks are arranged substantially in a matrix form.

20. The display apparatus of claim 8, wherein a number of the timing controllers is equal to a number of the display blocks.

* * * * *